United States Patent Office 3,110,381
Patented Nov. 12, 1963

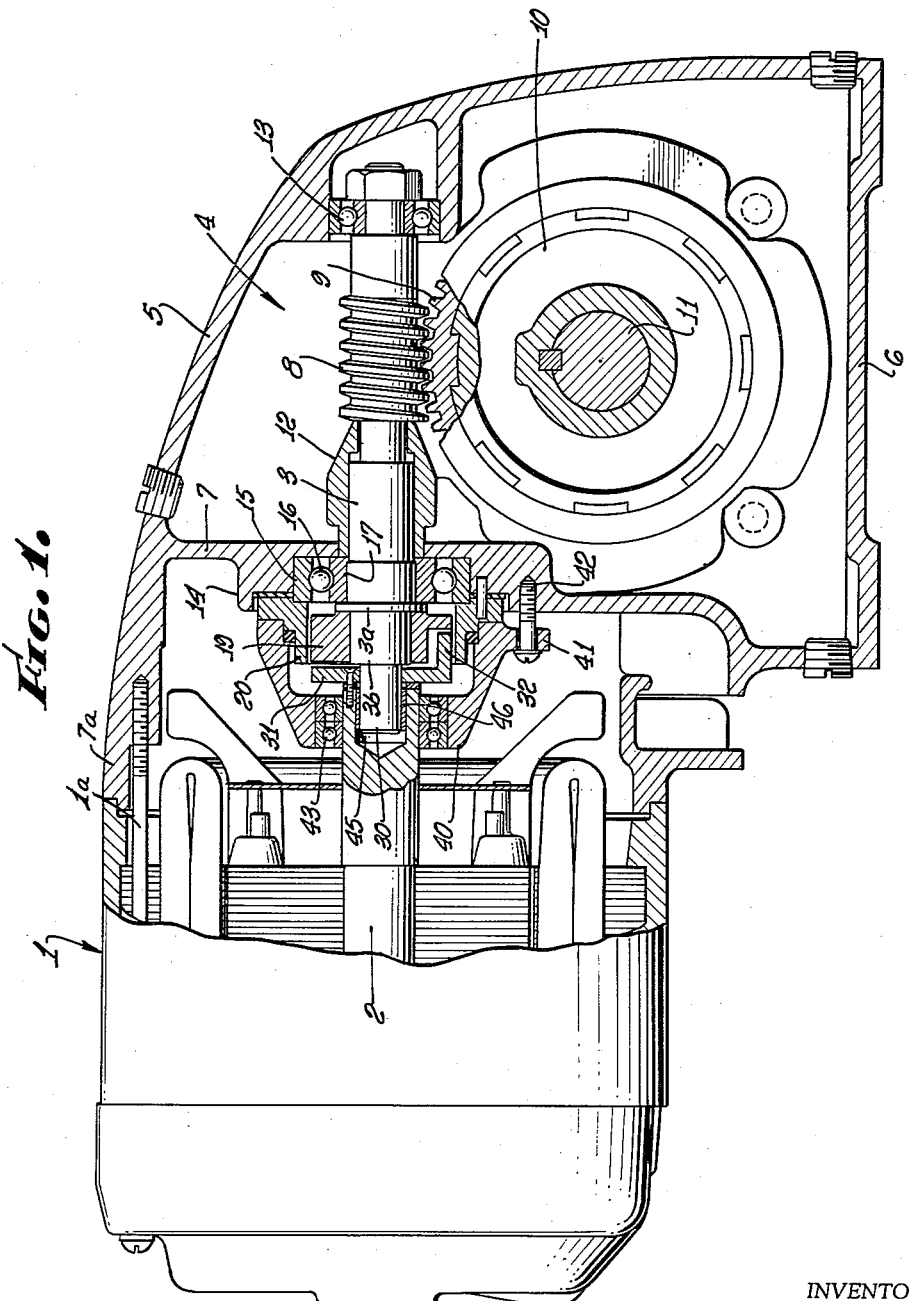

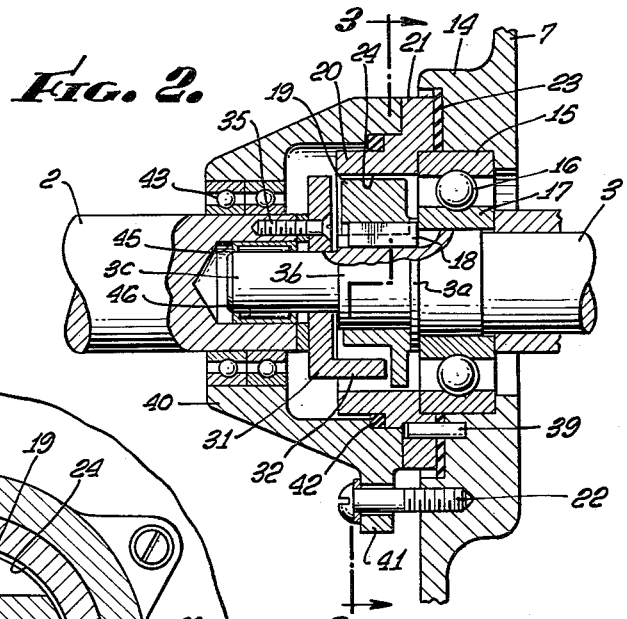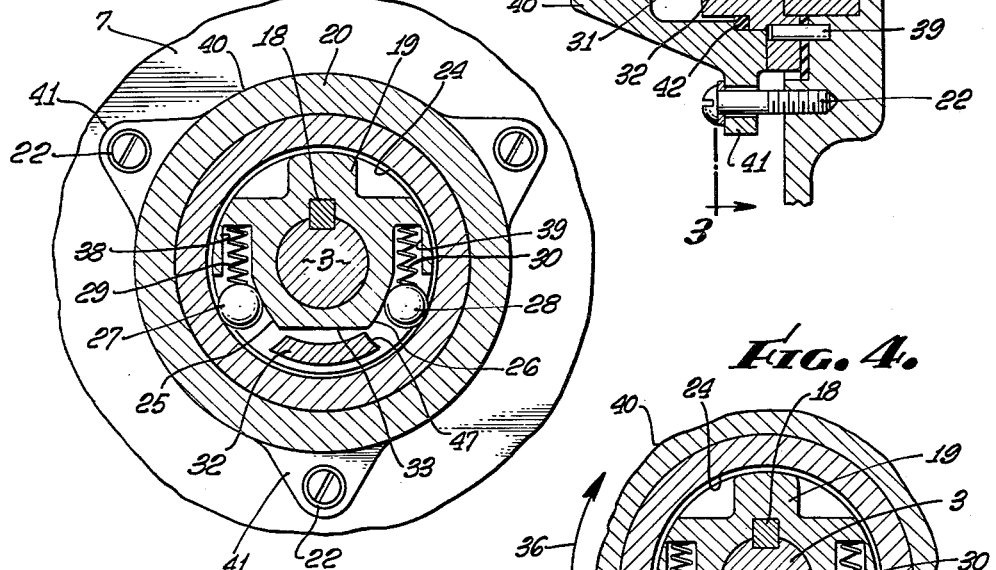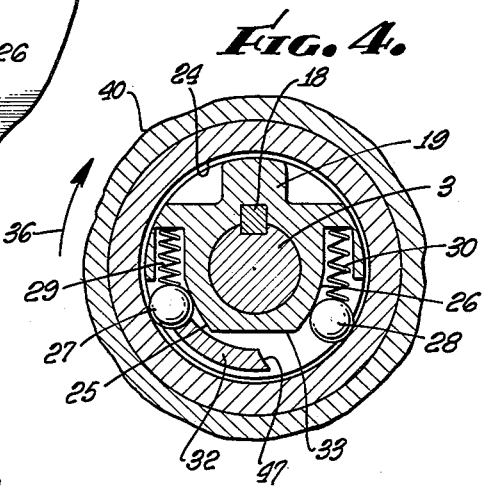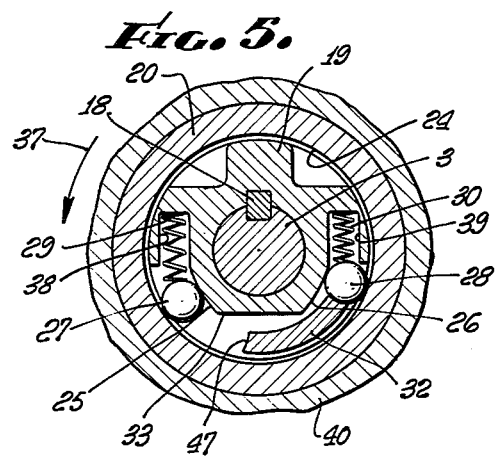

3,110,381
POWER UNIT WITH REVERSE
LOCKING DEVICE
James C. Leu, Mount Prospect, Ill., assignor, by mesne assignments, to The Emerson Electric Manufacturing Company, St. Louis, Mo., a corporation of Missouri
Filed Sept. 18, 1961, Ser. No. 138,931
1 Claim. (Cl. 192—8)

This invention relates to electric motor drives, especially to drives in which there is a coupling between the shaft driven by the motor and the input shaft of the reduction gearing, effected through a coaxial arrangement of the shafts.

It is one of the objects of this invention to provide in a simple manner a motor driven power unit in which it is assured that while the motor can transmit torque to the transmission, or speed change device, the speed change device when the motor is at a standstill cannot rotate in either direction. In this way, undesired driving of the motor from the speed change device is effectively prevented.

It is another object of this invention to include a compact reverse locking device for the speed changer or transmission arranged between the motor and the transmission along a common axis of the input shaft of the transmission.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claim.

Referring to the drawings:

FIGURE 1 is a view, mainly in longitudinal section, of a power unit incorporating the invention;

FIG. 2 is an enlarged fragmentary longitudinal section, illustrating the coupling between the motor unit and the speed reduction unit illustrated in FIG. 1;

FIG. 3 is a sectional view taken along a plane corresponding to line 3—3 of FIG. 2, and illustrating the apparatus in a stand-still position;

FIG. 4 is a view similar to FIG. 3, illustrating the apparatus when the motor shaft rotates in a clockwise direction; and FIG. 5 is a view similar to FIG. 4, illustrating the position of parts when the motor shaft is rotating in a counter-clockwise direction.

In FIG. 1 there is illustrated a power unit having a driving electric motor 1. The electric motor 1 is provided with an output shaft 2 adapted to drive an input shaft 3 of a speed reduction unit or transmission unit 4.

The transmission unit 4 may be provided with a fluid tight casing 5 having a base 6. In the form illustrated, the casing 5 has a left-hand wall 7 which separates the motor unit 1 from the speed changing device, and makes it possible to seal off the casing 5. The speed changing device has a peripheral mounting flange 7a to which the open end of the motor housing 1 is attached. Suitable fastening means 1a are provided for this purpose.

The speed changing device or transmission may include a worm 8 mounted on shaft 3, and engaging a worm wheel 9 mounted upon a spider 10 keyed to a load shaft 11.

A bushing 12 may be mounted upon the wall 7 to provide a journal bearing for shaft 3. At the right-hand end, ball bearing structure 13 is provided for supporting the shaft 3.

Since the present invention does not relate to the particular details of the speed changing mechanism, further description thereof is deemed unnecessary.

The coupling between the coaxial shafts 2 and 3 may be best described in connection with FIGS. 2, 3, 4, and 5. The wall 7 has a boss 14 for accommodating the outer race 15 of the ball bearing structure 16 for an enlarged portion of the shaft 3. The inner race 17 is mounted directly on the shaft 3.

The shaft 3 has a narrow collar 3a for holding the inner race 17 in place. To the left of collar 3a is short portion 3b of reduced diameter. Finally, a further reduced portion 3c is located in cylindrical recess or aperture 45 in motor shaft 2. A bearing structure 46 in recess 45 supports this portion 3c.

Portion 3b of shaft 3 is keyed as by the aid of a key 18 to a cam member 19. This cam member 19 projects into a flange 20 with clearance. This flange 20 has a base portion 21 clamped against the hub 14 as by a plurality of screws 22, which pass through ears 41 of a protective cap 4. A dowel 39 serves to position this flange 20 properly. In order to render the casing 5 fluid-tight, a gasket 23 is interposed between the base 21 and the hub 14.

The interior surface 24 of the flange 20 cooperates with the arcuate surfaces 25 and 26 of the cam member 19. The surfaces 25 and 26 converge toward the surface 24 so that the spaces defined between these surfaces 25 or 26, and the cylindrical surface 24 may serve as wedging spaces.

Spring pressed rollers 27 and 28 are disposed between these wedging surfaces and are urged into wedging relationship by the aid of compression springs 29 and 30. These springs are based in the recesses 38, 39 of the cam member 19. In the position shown in FIG. 3, the springs 29 and 30 cause engagement of both the rollers 27 and 28 with surfaces 24 and 25 or 26. Should the input shaft 3 be urged in one or the other direction, one or the other of these rollers 27 and 28 retain a wedging position and will prevent movement thereof. Thus shaft 3, in the position of FIG. 3, is restrained against angular movement in either direction.

In order to make it possible for the output shaft 2 to drive the input shaft 3, the output shaft carried an element 31 which has a tongue 32 extending between the rollers 27 and 28, and in the space formed between the flattened bottom surface 33 of the cam member 19 and the cylindrical surface 24.

The member 31 may be attached to the right-hand end of the shaft 2 as by the aid of plurality of screws 35.

Accordingly, should the output shaft 2 rotate in a clockwise direction as viewed in FIG. 4, and indicated by the arrow 36, the rolling element 27 will be urged out of wedging relationship; the shaft 3 is driven by compression of spring 29 through rolling element 27, in a clockwise direction.

On the other hand, should the shaft 2 rotate in a counter-clockwise direction as illustrated in FIG. 5 by arrow 37, then the rolling element 28 is urged out of wedging position and the input shaft 3 is likewise rotated in that direction.

Thus, in this way, it is assured that during stand-still of the motor 1 no power can be transmitted from the transmission device or speed changing device 4 to the motor shaft. The transmission is maintained at stand-still while the motor 1 is at a stand-still.

Housing cap 40 (FIG. 2) encloses the coupling structure. This housing cap provides the ears 41 (FIG. 4) through which the screws 22 may pass to urge the assembly together. The housing cap 40 is mounted entirely independently of the peripheral mounting flange 7a. A gasket 42 is interposed between the flange 20 and the cap in order to provide a fluid-tight structure.

The left-hand end of the cap 40 may provide a support for ball bearing structures 43 for supporting the right-hand end of the output shaft 2. The ball bearing structure 43 conveniently forms the sole support for the inner end of the rotor shaft 2.

The end surfaces of the member 32 are concave, as shown by reference character 47 in FIG. 4 so as to fit the contour of the rolling elements 27 and 28.

The inventor claims:

In a power transmission device: a motor unit having a housing open at one end, a rotor in the housing, and a shaft for the rotor; a speed changing device having a wall and a mounting flange extending about the wall, said mounting flange engaging the housing at the said open end thereof; fastening means securing the housing to said mounting flange; said speed changing device having an input shaft projecting through said wall; a bearing carried by the wall and supporting the outer end of said input shaft; a cap having a base; means mounting the base of the cap on the outer side of said wall and independently of the motor housing and independently of said mounting flange; a bearing mounted by said cap and supporting the end of the rotor shaft coaxially of said input shaft; said cap mounted bearing being the sole support for the said end of said motor shaft; and a coupling in the cap having companion parts respectively mounted by the ends of said shafts, one of said parts having braking provisions for normally restraining movement of the corresponding shaft in either direction, and released upon the application of a driving torque exerted by said motor shaft.

References Cited in the file of this patent

UNITED STATES PATENTS

| | | |
|---|---|---|
| 2,449,020 | Spraragen | Sept. 7, 1948 |
| 2,626,027 | Anderson | Jan. 20, 1953 |
| 2,973,070 | Firth et al. | Feb. 28, 1961 |

FOREIGN PATENTS

| | | |
|---|---|---|
| 1,003,585 | France | Mar. 19, 1952 |